United States Patent

[11] 3,617,537

[72] Inventor Floyd L. Vermette
 Jackson, Mich.
[21] Appl. No. 806,577
[22] Filed Mar. 12, 1969
[45] Patented Nov. 2, 1971
[73] Assignee George E. Snyder Associates, Inc.
 Jackson, Mich.

[54] BIOCHEMICAL SEWAGE TREATMENT VIA HIGH PURITY MOLECULAR OXYGEN
 9 Claims, 7 Drawing Figs.
[52] U.S. Cl............................................. 210/8,
 210/15, 210/18, 210/120, 210/195, 210/205
[51] Int. Cl............................................. C02c 1/08
[50] Field of Search........................................ 210/3–8,
 120, 14, 15, 194–197, 220, 221, 205, 18

[56] References Cited
UNITED STATES PATENTS

| Re.24,219 | 9/1956 | Pirnie | 210/15 X |
|---|---|---|---|
| 3,121,680 | 2/1964 | Ciabattari | 210/44 |
| 3,140,259 | 7/1964 | Kelly | 210/221 X |
| 3,234,123 | 2/1966 | Hinde | 210/15 X |
| 3,301,779 | 1/1967 | Kovacs | 210/53 X |
| 3,342,727 | 9/1967 | Bringle | 210/15 |
| 3,362,695 | 1/1968 | McDonnell | 261/92 |
| 3,470,091 | 9/1969 | Budd et al. | 210/7 X |
| 3,477,947 | 11/1969 | Kappe | 210/3 |
| 3,485,750 | 12/1969 | Albertson | 210/8 |
| 3,505,213 | 4/1970 | Anthony et. al. | 210/15 |
| 2,793,185 | 5/1957 | Albrektsson et al. | 210/44 |
| 3,264,213 | 8/1966 | Pav et al. | 210/221 X |

FOREIGN PATENTS

| 767,227 | 1/1957 | Great Britain | 210/63 |

Primary Examiner—Michael Rogers
Attorney—Olsen and Stephenson

ABSTRACT: A process for improving aerobic biochemical purification of organic liquid wastes which includes dissolving high-purity oxygen under pressure into water, and mixing the oxygen-charged water with the organic liquid wastes in one stage of treatment to increase dissolved oxygen concentration in the mixture above what it was in the organic liquid wastes before mixing. The process can be used with a lagoon method of aerobic biological sewage treatment as well as with an activated sludge sewage treatment. Apparatus is disclosed for carrying out the process.

INVENTOR
FLOYD L. VERMETTE

Olsen & Stephenson
ATTORNEYS

PATENTED NOV 2 1971                                3,617,537

INVENTOR
FLOYD L. VERMETTE

Olsen & Stephenson
ATTORNEYS 3,617,537

BIOCHEMICAL SEWAGE TREATMENT VIA HIGH PURITY MOLECULAR OXYGEN

BACKGROUND OF THE INVENTION

Sewage treatment involves the removal from water of those substances which were added to and transported by the water. This must be done if the water is to be sanitarily discharged or reused. The most prevalent and economical methods of what is presently considered complete treatment have for years been aerobic and biochemical in nature. These include the lagoon or oxidation pond method of aerobic biological sewage treatment as well as the activated sludge process of sewage treatment. A natural limiting factor has long been the inability to accomplish desirable concentrations of dissolved oxygen in biological cultures via dissolution from air, which, as is known, contains only 21 percent oxygen by volume.

SUMMARY OF THE INVENTION

This invention relates to apparatus and process for overcoming the inadequacies of the prior art by utilizing high purity molecular oxygen which is applied to organic liquid wastes (sewage) to promote and improve aerobic biochemical purification.

Dissolution of high purity molecular oxygen ($O_2$) poses an efficiency problem. Although improved technology and economy of increased production have reduced oxygen cost, it remains an appreciable item of expense if not used efficiently. The present invention teaches how the efficiency of dissolution of oxygen into waste water and biological culture can be greatly increased while maintaining the desirable elevated dissolved oxygen concentrations. The present invention also teaches how by strengthening the weakest parts of extant aerobic biochemical waste treatment systems the needed quantities of high-purity molecular oxygen can be further reduced.

When considering the present invention, it should be kept in mind that the amount of gas dissolved (absorbed) by a liquid is directly proportional to the pressure, provided that no chemical combination occurs between the solute and the solvent. In the case of a gas mixture the gasses dissolve in proportion to their partial pressures, i.e., the pressure each would exert respectively if it occupied the entire volume available instead of a part corresponding to its percentage by volume. Air is 21 percent oxygen by volume, and therefore, air is much less effective as a source for oxygen than is relatively pure molecular oxygen.

The rate of gas dissolution into liquid varies inversely with percentage saturation. Gas enters solution very slowly as saturation is approached. Gas escapes from solution very slowly when solvent is only slightly supersaturated. In the present invention, oxygen concentrations at and above saturation for normal temperature and pressure in air, is accomplished quickly because dissolution is at elevated pressure and/or in high purity oxygen atmosphere; and the pressure is then returned to that at which biological activity is desired. If oxygen concentration is raised to considerable in excess of concentration finally desired for biological activity, and the highly charged liquid is then mixed with subsaturated liquid concurrently with pressure reduction, bubbles do not form, and escape of oxygen is prevented. Final oxygen concentrations at and slightly in excess of saturation in air can quickly be so accomplished in the volume where biological activity is desired without loss of oxygen to atmosphere.

It is an overall object of this invention to treat sewage aerobically and biologically more rapidly and completely by maintaining dissolved oxygen concentration higher than is practicable by aeration.

A specific object of this invention is to raise the practicable dissolved oxygen concentration in aerobic biological sewage treatment cultures by mixing supersaturated water with water waste which is subsaturated.

It is a further object of this invention to mix water supersaturated with oxygen with subsaturated water waste to produce a mixture near saturation, without production of free gas bubbles escaping from liquid to atmosphere.

It is a further object of this invention to produce supersaturated water by turbulence in pressurized commercial grade oxygen environment, and to follow by subsequent release and mixing into subsaturated not pressurized water waste or biological culture.

It is a further object of this invention to produce oxygen-charged water rapidly in pressurized commercial grade oxygen atmosphere by turbulence which creates a great gas-liquid interface area.

Another object of this invention is to produce said high-purity oxygen environment by automatic controlled release of oxygen from a commercial pressurized oxygen vessel.

The ultimate object of one species of this invention is the continuous maintenance of high dissolved oxygen concentrations throughout an aerobic sewage treatment lagoon to result in elimination of odors and more complete removal of contaminants and botanical nutrient chemicals.

The ultimate object of a second species of this invention is maintenance of ambient dissolved oxygen saturation in activated sludge mixed liquor aerator effluent. The maintenance of dissolved oxygen saturation in mixed liquor effluent is to insure sufficient dissolved oxygen throughout final sedimentation to prevent anaerobic bulking and phosphate leaching from sludge into solution.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENTS

Figure 1:
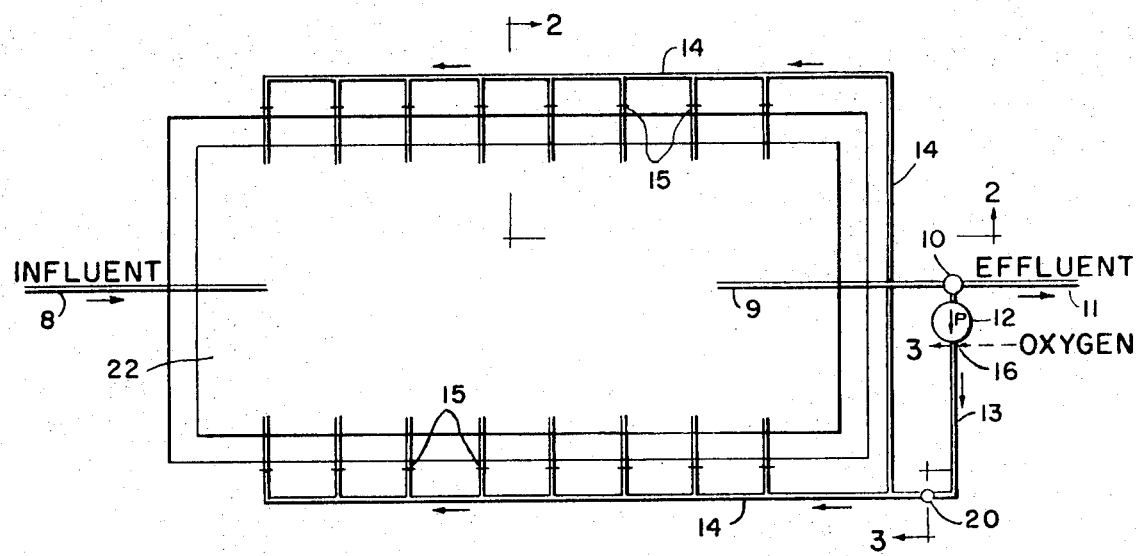
FIG. 1 is a schematic plan view of one modification of the invention, showing a lagoon or oxidation pond method of aerobic biological sewage treatment embodying the present invention.
Figure 2:
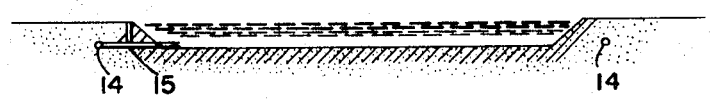
FIG. 2 is a sectional view along line 2—2 of FIG. 1.
Figure 3:
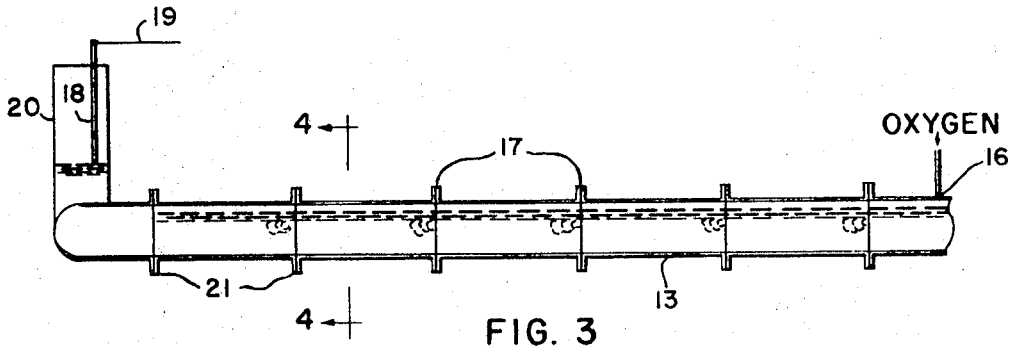
FIG. 3 is an enlarged partial sectional view of an oxygen-charging pressure conduit along line 3—3 of FIG. 1.
Figure 4:
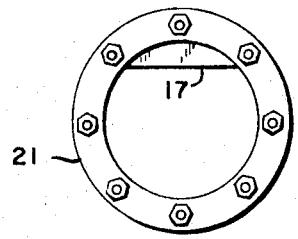
FIG. 4 is a sectional view of a pressure-charging conduit as indicated by line 4—4 of FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Reference is made first to FIGS. 1-4 for an explanation of the first modification of the invention wherein a lagoon is utilized to provide aerobic biological sewage treatment. As is there shown, sewage enters aerobic lagoon 22 via pipe 8 and discharges via pipe 9 by gravity to manhole 10. From manhole 10 effluent overflows via pipe 11. Because during certain short periods of the four yearly seasons conditions of loading and weather cause overloaded situations, it has been customary to design lagoons large enough to result in underloaded conditions during most of the year, thereby seeking to avoid overloaded conditions which might occur during the remainder of the year and which promote odors and inadequate treatment.

During periods when conditions would otherwise cause an overloaded situation, dissolved oxygen concentration of lagoon contents is raised by recirculating some flow from manhole 10 through pump 12 and pressure charging means or conduit 13 and distribution pipes 14. The liquid is pressurized by pump 12, and the pressure is reduced, and modifications to the distribution pattern are regulated by valves 15. Oxygen is introduced at junction 16 and dissolution assistance is by turbulence caused by plates 17 shown in FIGS. 3 and 4. Oxygen feed control is by sensor probe 18 and electrical signal transmission via wire 19 to automatic oxygen flow control apparatus which is commercially obtainable and not shown here. Oxygen control equipment is actuated to feed when liquid in chamber 20 contacts probe 18, and stops oxygen flow when contact with probe 18 is broken. Turbulence is caused by plates 17, bolted between the pipe flanges 21, acting as upside down weirs. The lagoon effluent charged with oxygen, $O_2$, is diluted into the lagoon contents at points as shown to raise dissolved oxygen concentration to near saturation accordant with ambient temperature and pressure conditions.

It will be noted that plate 17 is shown sectorial in shape. This is exemplary only. It is not intended to infer that other plate shapes would not suffice.

Thus, in the embodiment of the invention shown in FIGS. 1—4, apparatus and a process are provided for improving sewage treatment in a lagoon or oxidation pond method of aerobic biological sewage treatment wherein high purity oxygen from a source at 16 is dissolved into recirculated water from manhole 10, the dissolving under pressure of the oxygen into the recirculated water occurring mainly in the conduit 13, after which the oxygen-charged water is mixed with sewage by means of the distribution pipes 14 to increase dissolved oxygen concentration in the lagoon above what it was before mixing the oxygen-charged water in the lagoon.

Figure 5:
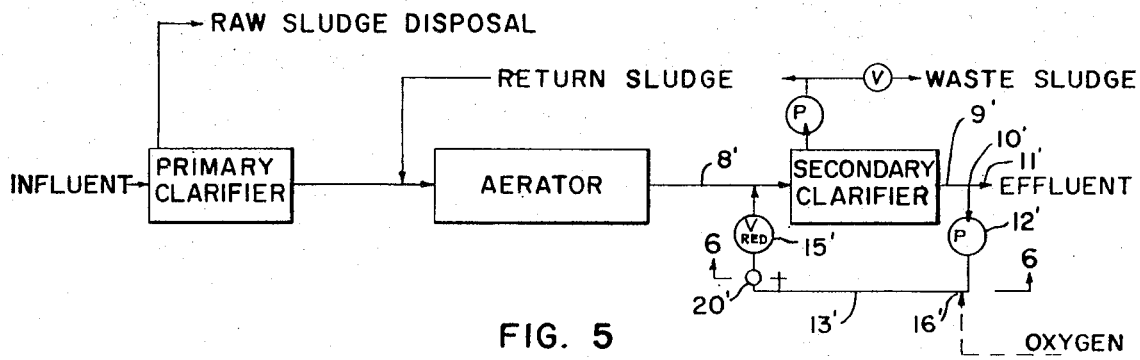
FIG. 5 is a schematic plan view of another modification of the invention, showing an activated sludge sewage treatment plant embodying the present invention.
Figure 6:
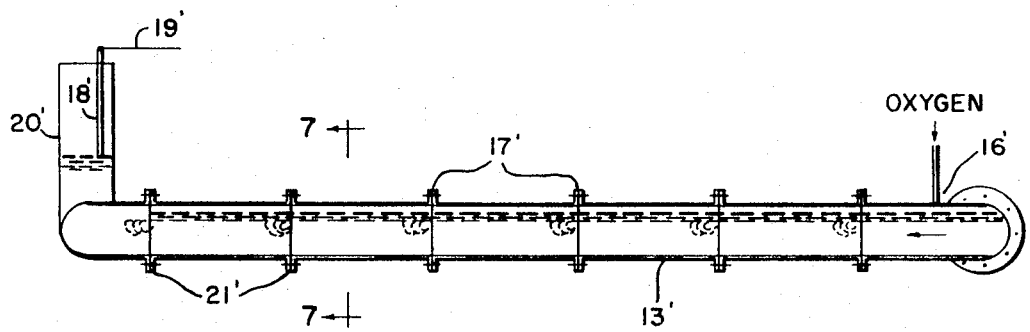
FIG. 6 is a sectional view of a pressure-charging conduit along line 6—6 of FIG. 5.
Figure 7:
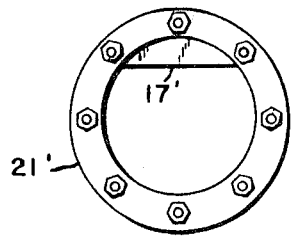
FIG. 7 is a sectional view of a pressure-charging conduit as indicated by line 7—7 of FIG. 6.

Reference is now made to FIGS. 5—7 for explanation of a second embodiment of this invention wherein an activated sludge sewage treatment plant is utilized to provide aerobic biological sewage treatment. It will be noted that application of this embodiment of the present invention is limited to the vicinity of the secondary clarifier. Activated sludge sewage treatment often does not include primary clarification. Many small plants have been installed in recent years which omit a primary clarifier. In activated sludge installations a high concentration of solids containing aerobic micro-organisms is maintained in the aerator, and dissolved oxygen concentrations above 50 percent saturation are most difficult to attain. During quiescent conditions in secondary clarifier aerobic organisms in the settling and settled sludge continue to respire and reduce the dissolved oxygen concentration. Quiescent time is necessary for settling and concentration of sludge; yet quiescent time depletes dissolved oxygen concentration. Depleted dissolved oxygen causes sludge to rise and escape in plant effluent. When dissolved oxygen is less severely depleted, phosphates are leached or dissolved from the sludge into the liquid which passes out as supernatant plant effluent. By the present invention, dissolved oxygen concentration in mixed liquor, aerator effluent, is raised to near or even slightly above saturation. By maintaining dissolved oxygen concentration about double what it would otherwise be, septic sludge rise, and phosphate leaching and escape is prevented.

A fraction of the clarified effluent from pipe 9' is withdrawn at point 10' and pressurized by pump 12'. Oxygen is injected at 16' into pressure-charging means or conduit 13'. Increased pressure and turbulence by plates 17' between pipe flanges 21' cause the rapid dissolution of oxygen into the water. This arrangement of the pressure charging means or conduit 13' is shown in FIGS. 6 and 7. Oxygen feed control is by sensor probe 18' and electrical signal transmission via wire 19' to automatic oxygen flow control valve which is commercially obtainable and not shown here. Oxygen control equipment is actuated to feed when liquid in chamber 20' contacts probe 18', and stops oxygen flow when contact with probe 18' is broken. Pressure is reduced by valve 15' and oxygen-charged water or effluent is diluted into flow of pipe 8' to produce a primary clarifier influent approximately saturated with oxygen.

It is claimed:

1. Apparatus for improving the phosphorus removing capacity of an activated sludge sewage treatment plant which has an aerator and a clarifier receiving the mixed liquor effluent from the aerator, comprising a pressure-charging means for dissolving oxygen into a liquid under pressure, means for recirculating to said pressure-charging means a portion of the effluent discharged from said clarifier, means for introducing molecular oxygen under pressure into said pressure-charging means, and discharge means for mixing the oxygen-charged effluent from said pressure-charging means with the clarifier influent to produce a dissolved oxygen saturated mixture for clarification.

2. Apparatus as is defined in claim 1, wherein said pressure charging means comprises a conduit having an inlet in communication with the effluent recirculating means and the oxygen-introducing means and an outlet in communication with said discharge means, said conduit having a plurality of transverse plates to promote dissolution of the molecular oxygen into the recirculated effluent.

3. Apparatus as is defined in claim 1, wherein said means for introducing molecular oxygen into said pressure-charging means includes controls responsive to a condition indicating the load on said clarifier.

4. Apparatus as is defined in claim 1, wherein said discharge means includes at least one pressure reducing valve for reducing the pressure of oxygen-charged effluent discharged to said clarifier.

5. A process for improving the phosphorus removing capability of an activated sludge sewage treatment plant which has an aerator and a clarifier receiving the mixed liquor effluent from the aerator, comprising the steps of recirculating a portion of the clarified effluent from the clarifier to the mixed effluent from the aerator, and during such recirculation charging high purity oxygen under pressure into the recirculated portion of the clarified effluent so that oxygen charged clarified effluent is mixed with the liquor effluent from the aerator.

6. A process as is defined in claim 5, wherein the step of oxygen charging utilizes commercially pure oxygen gas.

7. A process as is defined in claim 5, wherein the pressure of the oxygen-charged clarified effluent is reduced immediately prior to mixing with the liquor effluent from the aerator.

8. A process for improving the phosphorus removing capability of an activated sludge sewage treatment plant which has an aerator and a clarifier receiving the mixed liquor effluent from the aerator, comprising the steps of dissolving high-purity oxygen under pressure into water to provide a highly oxygen-charged water, and mixing the highly oxygen-charged water with the mixed liquor clarifier influent to produce a dissolved oxygen saturated mixture for clarification.

9. A process as is defined in claim 8, wherein the pressure of the highly oxygen-charged water is reduced immediately prior to mixing the charged water with the clarifier influent.

* * * * *